US006663120B1

(12) United States Patent
Fagerqvist

(10) Patent No.: US 6,663,120 B1
(45) Date of Patent: Dec. 16, 2003

(54) HAND-PROPELLED TRUCK

(75) Inventor: Björn Fagerqvist, Saltsjö-Boo (SE)

(73) Assignee: Zaniboo Hus & Maskin AB (SE)

( * ) Notice: Subject to any disclaimer, the term of this patent is extended or adjusted under 35 U.S.C. 154(b) by 5 days.

(21) Appl. No.: 09/958,138

(22) PCT Filed: Jun. 7, 2000

(86) PCT No.: PCT/SE00/01175

§ 371 (c)(1),
(2), (4) Date: Oct. 5, 2001

(87) PCT Pub. No.: WO00/74995

PCT Pub. Date: Dec. 14, 2000

(30) Foreign Application Priority Data

Jun. 9, 1999 (SE) ............................................. 9902164

(51) Int. Cl.$^7$ ................................................. B62B 1/12
(52) U.S. Cl. ...................... 280/47.27; 280/646; 414/490
(58) Field of Search ............................. 280/47.27, 646, 280/47.11, 47.131, 47.17, 47.18, 47.24, 47.28, 47.29, 47.34; 414/444, 490

(56) References Cited

U.S. PATENT DOCUMENTS

| 2,884,257 A | * | 4/1959 | Menne ........................ 280/40 |
| 3,666,285 A | * | 5/1972 | Fertig ...................... 280/47.12 |
| 3,729,209 A | * | 4/1973 | Litz ............................ 280/652 |
| 4,123,819 A | * | 11/1978 | Benedetti ....................... 16/24 |
| 4,460,189 A | * | 7/1984 | Goff ........................ 280/47.27 |
| 4,712,657 A | * | 12/1987 | Myers et al. .................. 190/28 |
| 5,263,727 A | * | 11/1993 | Libit et al. .................... 280/40 |
| 5,524,731 A | * | 6/1996 | Grieg .......................... 188/19 |
| 6,036,333 A | * | 3/2000 | Spiller ....................... 362/192 |
| 6,039,332 A | * | 3/2000 | Austin ..................... 280/47.17 |

FOREIGN PATENT DOCUMENTS

| WO | WO 99/36232 | 7/1999 | |
| WO | WO 9936232 A1 | * 7/1999 | ............. B26B/1/04 |
| WO | WO 0074995 A1 | * 12/2000 | ............. B26B/1/04 |

* cited by examiner

Primary Examiner—Brian L. Johnson
Assistant Examiner—Kelly E Campbell
(74) Attorney, Agent, or Firm—Larson & Taylor, PLC

(57) ABSTRACT

A hand-propelled truck is provided which includes a frame and a pair of wheels for supporting the frame above a floor. For each wheel of the pair of wheels, a wheel support is connected to the frame and mounts the associated wheel for rotation about an axis of rotation. The wheel support is rotatable relative to the frame about an indexing axis between a first indexed position, in which the axis of rotation of the wheel is oriented in a first direction, and a second indexed position, in which the axis of rotation of the wheel is orientated in a second direction. A wheel indexing and latching device includes a first latching member on the wheel support and a co-operating second latching member on the frame. The first and second latching members are movable relative to one another along the indexing axis between a wheel indexing position, in which the wheel support is rotatable between the first and second indexed positions, and a wheel latching position, in which the latching members latch the wheel support against rotation about the indexing axis. The wheel support and the second latching member provide limited relative movement of the wheel support at least in one direction along the indexing axis, and the first latching member is movable relative to the wheel support along the indexing axis between the wheel indexing position and the wheel latching position.

7 Claims, 5 Drawing Sheets

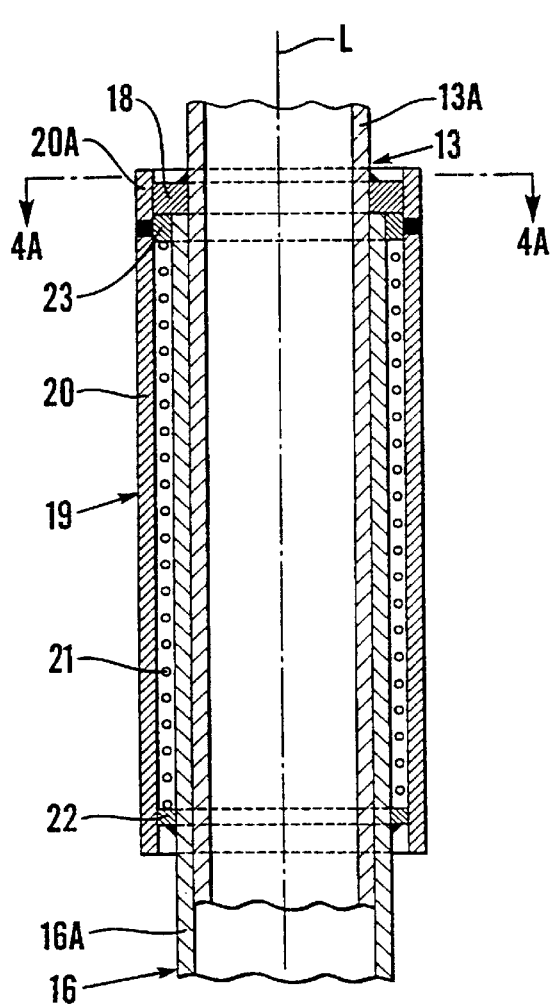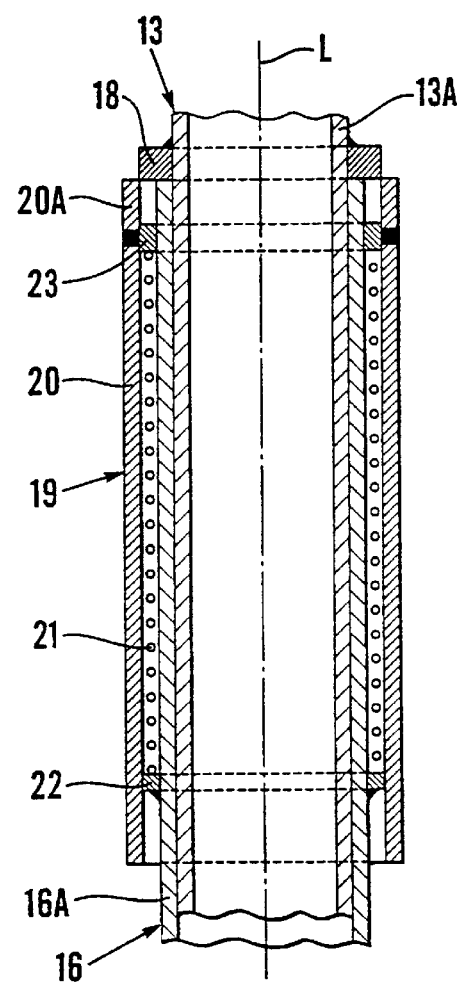
Fig.4  Fig.5
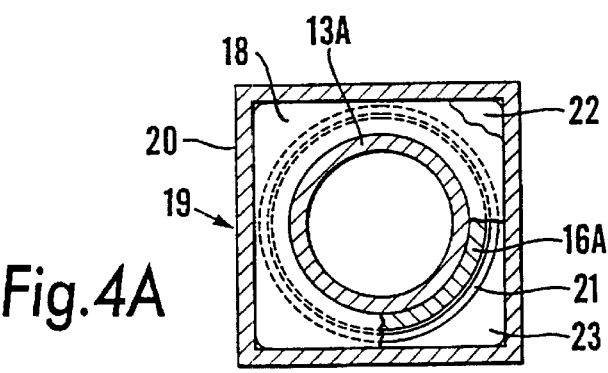
Fig.4A

HAND-PROPELLED TRUCK

This invention relates to manually operated devices for the transportation of articles of various kinds along a floor on a wheeled load-carrying frame, and in particular the invention relates to a hand-propelled truck which in one form includes a frame and a pair of wheels for supporting the frame above a floor wherein the wheels can be indexed to enable the truck to move either in a forward direction or sideways.

An embodiment of devices of the kind with which the invention is concerned is disclosed in U.S. Pat. No. 4,460,189. That embodiment is a two-wheeled hand-propelled truck for the transportation of articles and comprises a generally rectangular frame. The wheels are mounted at the longitudinal frame sides adjacent one end of the frame. At the opposite end of the frame handles are provided for the manipulation of the truck. The wheels can be indexed between a position for forward movement of the truck with the axes of rotation of the wheels extending in a first direction generally transverse to the longitudinal sides of the frame and a position for sideways movement of the truck with the axes of rotation of the wheels orientated at an angle, such as 90 degrees, to the first direction. Indexing the wheels to the position for sideways movement is advantageous e.g. when long objects have to be transported in narrow passages.

Although not so limited, the invention can be embodied in a two-wheeled hand-propelled truck of the kind disclosed in the just-mentioned publication.

The invention provides a hand-propelled truck having wheels which can be selectively indexed for movement in a forward direction or sideways by a simple and easy-to-operate mechanism. In comparison with a hand-propelled truck as disclosed in the above-identified publication, the hand-propelled truck according to the invention is distinguished by the features set forth in the characterising part of the independent claim. The dependent claims recite features of preferred embodiments of the invention.

The invention will be more fully understood from the following description of an embodiment shown by way of example in the accompanying drawings.

FIG. 4 is a longitudinal sectional view of a mechanism for adjusting the position of one of the wheels and latching the wheel in the adjusted position, the mechanism being shown in a position in which the wheel is latched in a selected indexed position;

FIG. 4A shows the wheel indexing and adjusting mechanism as viewed from line 4A—4A in FIG. 4;

Figure 6:
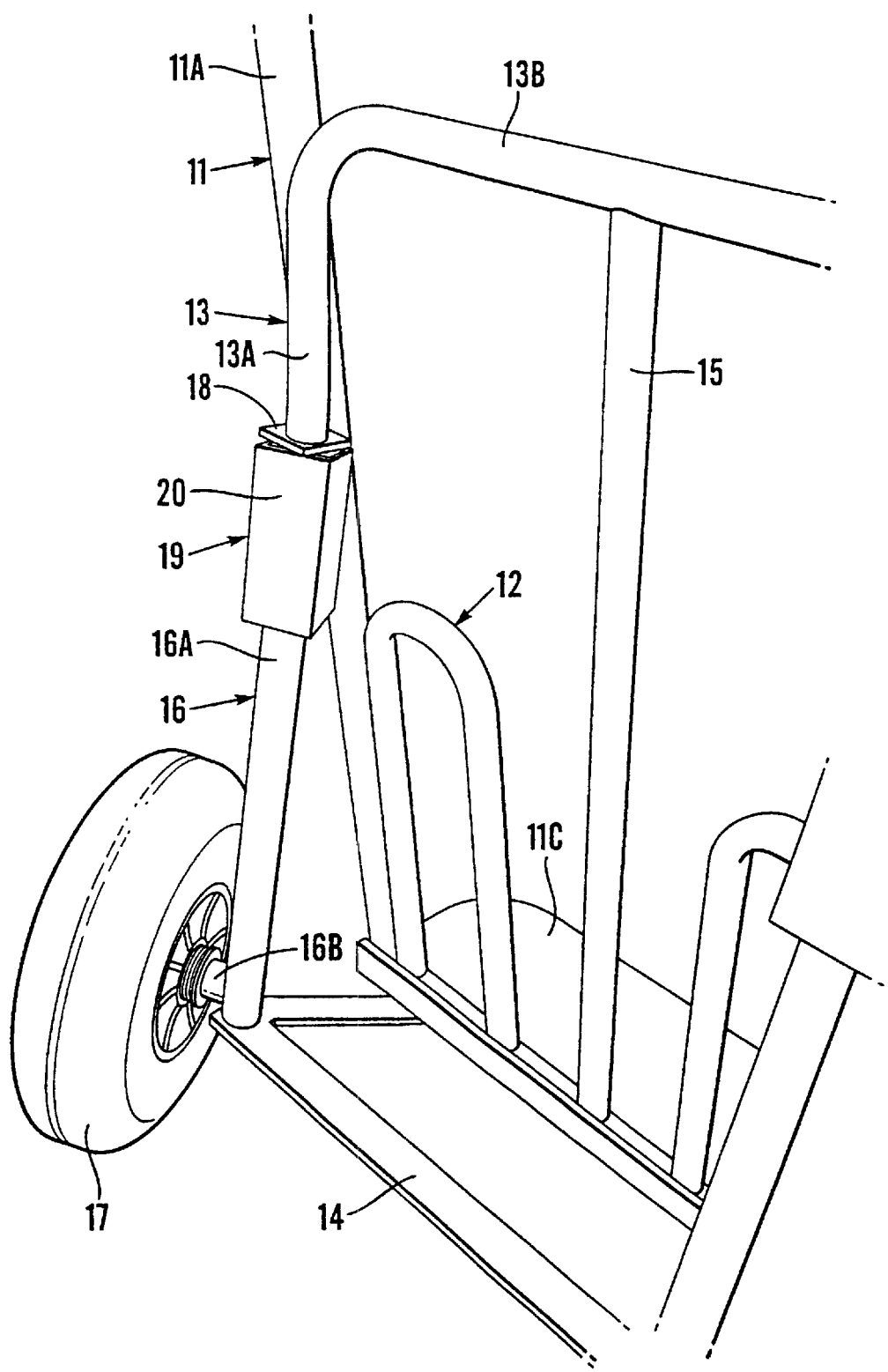

FIG. 5 is a longitudinal sectional view similar to FIG. 4 but shows the wheel indexing and latching mechanism in a position in which indexing of the wheel is possible; and FIG. 6 is a fractional perspective view of the truck and shows one wheel adjusted to a position between the position for movement of the truck in the normal forward direction and a position for movement of the truck sideways at right angles to the forward direction.

As shown by way of a non-limiting example in the drawings, the hand-propelled truck includes a rigid frame comprising an elongate, generally rectangular frame part 11 made of steel tubes and having longitudinal sides 11A, a first transverse end member which is integral with the longitudinal sides and forms a handle 11B, and a second transverse end member in the form of a cantilevered toe plate 11C. The ends of the longitudinal sides 11A remote from the handle 11B are secured (welded) to the toe plate 11C. In the present description, the end of the frame part 11 having the handle 11B is regarded as the upper end of the frame whereas the end having the toe plate 11C is regarded as the lower end.

The toe plate 11C forms part of a load platform that also includes a platform arm 12 which is pivotally movable about a transverse axis between a folded down or extended position, in which it rests on the toe plate 11C, and a folded up or retracted position (the position shown in the drawings), in which is it positioned between the longitudinal sides 11A of the frame part 11.

The frame also comprises a wheel support structure secured to the lower portion of the frame part 11. The wheel support structure includes a U-shaped tubular member 13 having parallel arms 13A and an upper transverse part 13B, and also includes a lower transverse member 14 which interconnects the free ends of the arms 13A of the U-shaped tubular member 13 and the toe plate 11C. At the transitions 13C between the arms 13A and the upper transverse part 13B, the U-shaped tubular member 13 is welded to the sides 11A of the frame part 11. Moreover, the wheel support structure includes a bracing tube 15 extending lengthwise of the frame part 11 and welded to the upper transverse part 13B of the U-shaped tubular member 13 and to the toe plate 11C.

Each arm 13A of the U-shaped tubular member 13 carries a rotatable wheel support 16 formed by a tube 16A surrounding the arm 13A along the greater portion of the length of the arm and by a cantilevered wheel axle 16B which is secured to the wheel support tube 16A adjacent the lower end thereof and extends from the tube at right angles to it. A wheel 17 is rotatably mounted on the wheel axle 16B.

Figure 2:
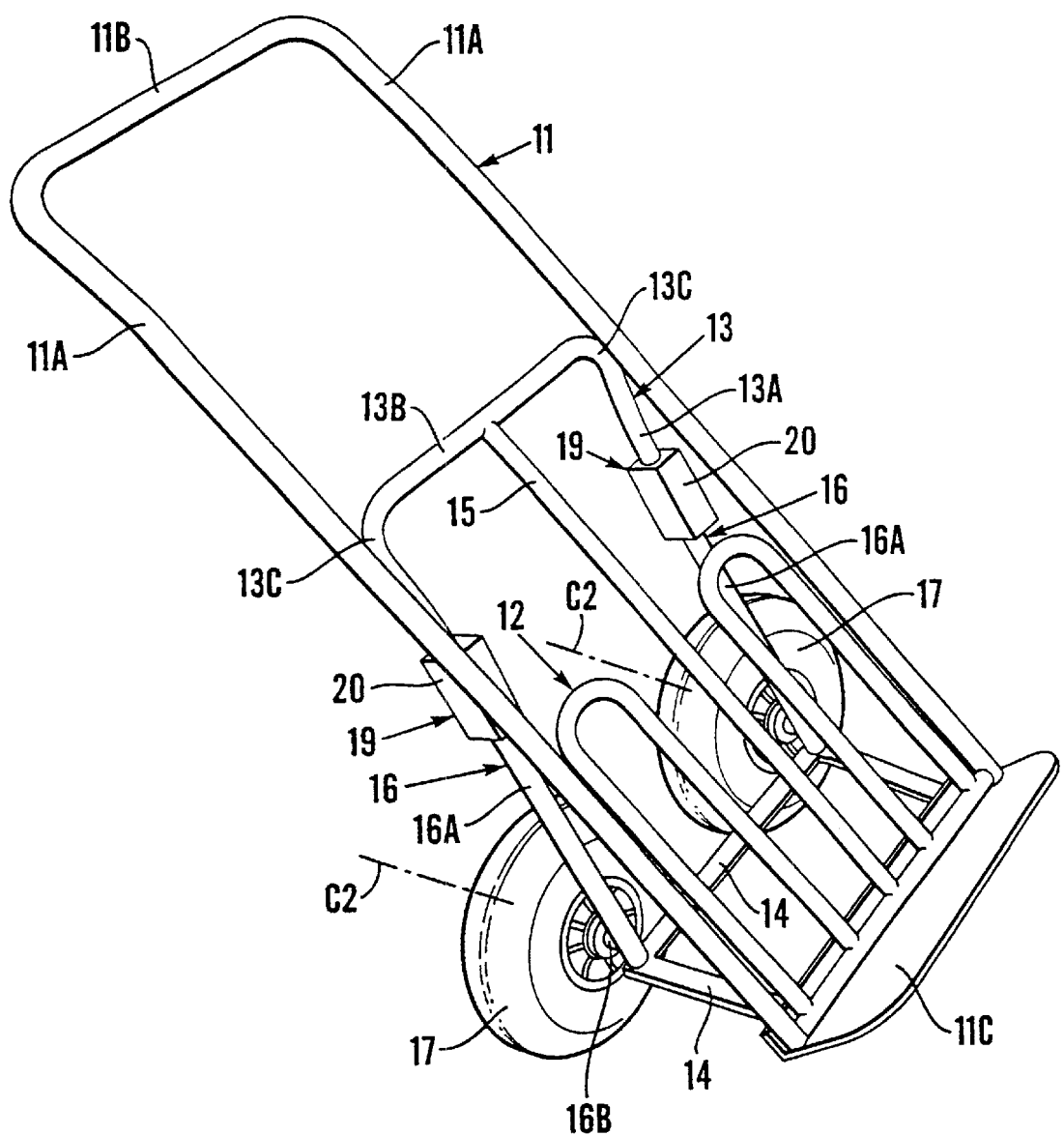
FIG. 2 is a perspective view similar to FIG. 1 but shows the wheels indexed to a position for sideways movement of the truck.
Figure 3:
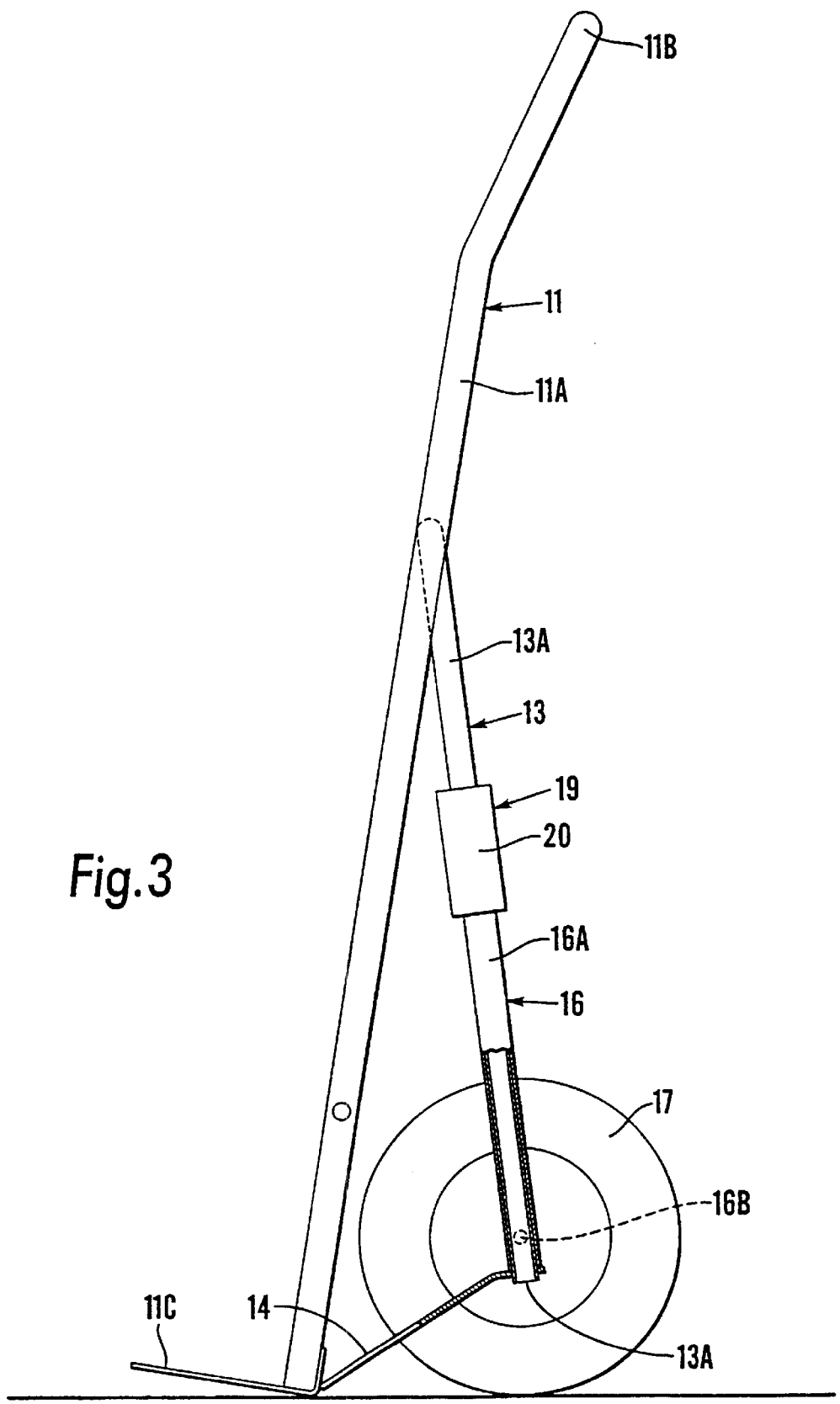
FIG. 3 is a side view, partly in section, of the truck in a parking position with the wheels in the same position as in FIG. 1.

The wheel support tube 16A is held against axial movement on the arm 13A by the lower transverse member 14, see FIG. 3, and by an abutment plate 18 which is secured (welded) to the arm 13A above the upper end of the wheel support tube 16A, see FIGS. 4 and 5. By rotating the wheel supports 16 one-quarter of a full turn about the arms 13A of the U-shaped tubular member 13 it is possible to adjust the wheels 17 individually between a first indexed position, shown in FIG. 1, in which the wheel axles 16B, and hence the axes of rotation of the wheels, extend along a common line C1 which is parallel to the lower end of the frame part 11, and a second indexed position, shown in FIG. 2, in which the wheel axles 16B, and hence the axes of rotation of the wheels, lie on spaced-apart parallel lines C2 extending at right angles to the line C1. As will become apparent from the following description, the wheels 17 can also take at least one additional position between the illustrated first and the second wheel positions.

Associated with each wheel 17 is a wheel indexing and latching device, generally designated by 19, for adjusting the wheel to the first or the second wheel position and latching it in the selected position. The structure and function of the wheel indexing and latching device 19 will be described with reference to FIGS. 4 to 6.

The wheel indexing and latching device 19 includes a cylindrical latching member body in the shape of a sleeve 20 of square cross-section which surrounds the upper portion of the circular cylindrical wheel support tube 16A. The internal cross-section of the sleeve is square and its internal width is larger than the outer diameter of the wheel support tube 16A. In the open space between the sleeve 20 and the wheel support tube 16A a helical compression spring 21 is accommodated. The lower end of the spring 21 rests on a lower spring support 22 received in the open space between the wheel support tube 16A and the sleeve 20 slightly above the lower end of the latter and secured to the wheel support tube. The upper end of the spring 21 abuts an upper spring support 23 which is also received in the open space between the wheel support tube 16A in the sleeve 20 slightly below the upper sleeve end and secured to the inner surface of the sleeve. Thus, the spring 21 constantly urges the square sleeve 20 upwards. Upward movement of the sleeve is limited by the abutment plate 18, the outer contour of which is square and corresponds to the square internal contour of the cross-section of the sleeve 20.

As indicated in FIG. 4A, the outer contour of the lower spring support 22 is also square and corresponds to the square internal contour of the sleeve 20. Thus, the sleeve 20 can be displaced axially relative to the lower spring support 22 but in all positions is non-rotatable relative to that spring support. Consequently, upon rotation of the sleeve 20 the wheel support tube 16A and the wheel 17 mounted thereon will also be rotated about an indexing axis L formed by the coinciding axes of the wheel support tube 16A and the arm 13A of the U-shaped tubular member 13.

Figure 1:
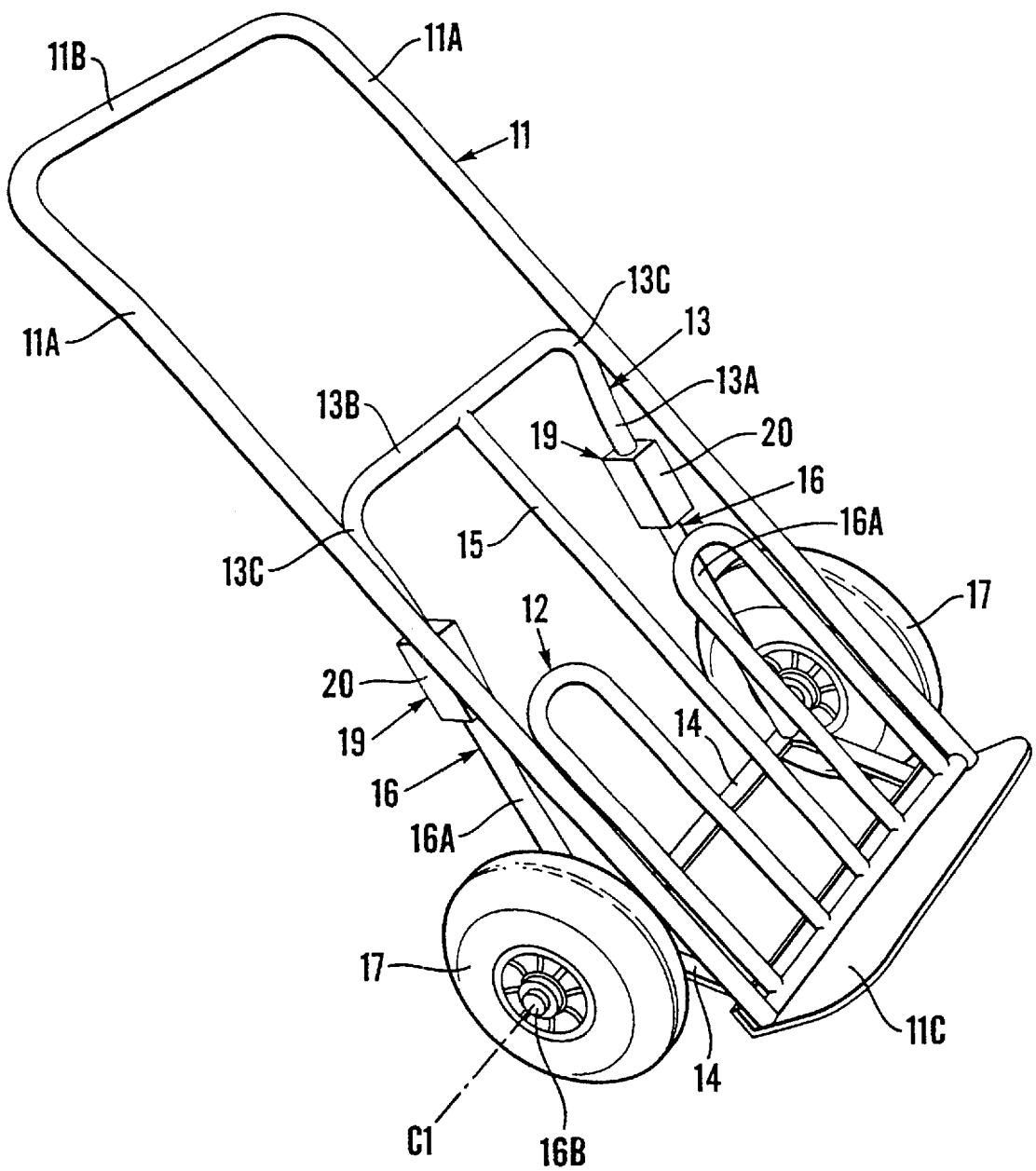
FIG. 1 is a perspective view of a hand-propelled truck embodying the invention, the wheels of the truck being shown in a normal position, namely a position for moving the hand truck in a forward direction.

In the position of the wheel indexing and latching device 19 which is shown in FIG. 4 and corresponds to one of the possible indexed positions of the associated wheel 17 of the truck, such as the indexed position shown in FIG. 1, the sleeve 20 is fully displaced upwards so that the upper spring support 23 abuts the abutment plate 18. The upper end portion 20A of the sleeve 20 constitutes a first latching member, which in this indexed position of the wheel 17 is in a wheel latching position in which it engages and co-operates with a second latching member formed by the abutment plate 18 to hold the wheel support tube 16A against rotation about the indexing axis L. The upper end portion 20A and the abutment plate 18 accordingly forms a kind of plug-and-socket connector device that latches the wheel support 16 and hence the associated wheel 17 in the selected indexed position.

If the wheel 17 is to be placed in a different indexed position, such as the indexed position shown in FIG. 2, the square sleeve 20 is first manually displaced downwards to a wheel indexing position, namely until its upper end is at or below the level of the underside of the abutment plate 18, see FIG. 5. Then the sleeve 20, and hence also the wheel support tube 16A and the wheel 17, are turned one-quarter of a full turn. The sleeve is then released so that it returns to the wheel latching position shown in FIG. 4, in which the sleeve is blocked against turning as a result of the engagement of the abutment plate 18 in the upper end portion 20A of the sleeve and the upper spring support 23 engages the underside of the abutment plate 18. During the turning movement of the sleeve 20, the upper end portion 20A of the sleeve engages the underside of the abutment plate 18, see FIG. 6, so that the spring 21 will push the sleeve upwards over the abutment plate 18 as soon as the sleeve has been turned through one-quarter of a full turn.

It is also possible to select an arbitrary position between the two described indexed wheel positions. This is done by allowing the upper end of the square sleeve 20 to remain in engagement with the underside of the abutment plate 18 under the influence of the force applied by the compression spring 21 so that the wheel 17 is retained in the selected position solely by friction. Naturally, it is also possible to provide one or more fixed intermediate indexed positions by shaping the abutment plate 18 as a polygon having an even number of sides larger than four or by providing one or more projections on the underside of the abutment plate and one or more co-operating notches in the upper end of the sleeve 20.

As is apparent from the foregoing description, the wheels 17 need not be displaced along the indexing axis L, that is, along the axis of rotation of the wheel supports 16, to be indexed between the available indexed positions. The only relative movement along the indexing axis L that is necessary is the relative movement of the square sleeve 20 and the abutment plate 18, that is, between the first and second latching members. Consequently, the indexing of the wheel 17 requires only a moderate effort even if the truck carries a load.

What is claimed is:

1. A hand-propelled truck, comprising:
   a frame,
   a pair of wheels for supporting the frame above a floor, and for each wheel of said pair of wheels:
   (a) a wheel support carried by the frame and mounting the associated wheel for rotation about an axis of rotation, said wheel support being rotatable relative to the frame about an indexing axis between a first indexed position, in which the axis of rotation of the wheel is orientated in a first direction, and a second indexed position, in which the axis of rotation of the wheel is orientated in a second direction including an angle with the first direction, and
   (b) a wheel latching device including a first latching member on the wheel support and a co-operating second latching member on the frame, the first and second latching members being movable relative to one another along the indexing axis between a wheel indexing position, in which the wheel support is rotatable between the first and second indexed positions, and a wheel latching position, in which the latching members latch the wheel support against rotation about the indexing axis,
   wherein an upper portion of the wheel support and the second latching member provide limited relative movement of the wheel support at least in one direction along the indexing axis and the first latching member is movable relative to the wheel support along the indexing axis between the wheel indexing position and the wheel latching position.

2. The hand-propelled truck as claimed in claim 1, in which the first latching member is provided on a latching member body enclosing a portion of the wheel support and in which the latching members form a plug-and-socket connector device.

3. The hand-propelled truck as claimed in claim 1, in which the wheel support includes a tubular member surrounding a circular cylindrical part of the frame and the first latching member is provided on a sleeve having a non-circular internal cross-section and surrounding said part of the frame, a non-circular part of the second latching member being received in the sleeve in the wheel latching position.

4. The hand-propelled truck as claimed in claim 3, in which the sleeve is a tubular member of rectangular cross-section and the second latching member is receivable in one end of the sleeve upon relative movement of the latching members from the wheel indexing position to the wheel latching position.

5. The hand-propelled truck as claimed in claim 3, in which the latching members are resiliently urged towards the wheel latching position.

6. The hand-propelled truck as claimed in claim 3, in which the wheel support abuts the second latching member in said one direction.

7. The hand-propelled truck as claimed in claim 1, in which the angle included between the first direction and the second direction is 90 degrees.

* * * * *